United States Patent [19]
Kircher

[11] 3,781,521
[45] Dec. 25, 1973

[54] AUTOMATIC COFFEEMAKER WITH AUDIBLE SIGNAL MEANS

[75] Inventor: Paul J. Kircher, Mansfield, Ohio

[73] Assignee: Westinghouse Electric Corporation, Pittsburgh, Pa.

[22] Filed: Jan. 18, 1972

[21] Appl. No.: 218,791

[52] U.S. Cl. ............... 219/442, 99/340, 116/148, 219/265, 219/269, 219/494, 219/506, 340/396, 340/417
[51] Int. Cl. ............................................. F27d 11/02
[58] Field of Search .................. 219/264, 265, 269, 219/441, 442, 494, 506; 99/285, 341, 342, 343, 344; 116/148; 340/236, 332, 392, 417, 393, 396

[56] References Cited
UNITED STATES PATENTS

| | | | |
|---|---|---|---|
| 3,226,528 | 12/1965 | Martin | 219/441 |
| 3,364,844 | 1/1968 | Felske | 99/344 X |
| 2,637,799 | 5/1953 | Wood | 219/265 |
| 2,761,375 | 9/1956 | Jepson | 99/344 |
| 2,843,720 | 7/1958 | Young | 219/441 |
| 2,918,559 | 12/1959 | Pramaggiore | 219/269 |
| 3,134,885 | 5/1964 | Pramaggiore | 219/264 |
| 3,385,950 | 5/1968 | Lipor | 99/344 X |
| 3,430,232 | 2/1969 | Martin | 340/417 |

FOREIGN PATENTS OR APPLICATIONS

| | | | |
|---|---|---|---|
| 530,391 | 7/1955 | Italy | 99/344 |

Primary Examiner—Volodymyr Y. Mayewsky
Attorney—Dallett Hoopes

[57] ABSTRACT

Signal means to audibly indicate the termination of a cooking or brewing cycle in an automatic electric appliance and the beginning of a cycle wherein a warming heater is employed to maintain the cooked or brewed food-stuff heated. The signal means includes a snap-acting bimetal disposed adjacent the warming heater and a movable pin having one end adjacent one face of the bimetal and the other end disposed a short distance from a bell. Energization of the warming heater causes the bimetal to snap against the pin and drive it against the bell providing an audible signal that the cooking cycle is terminated and the warming heater energized.

3 Claims, 4 Drawing Figures

AUTOMATIC COFFEEMAKER WITH AUDIBLE SIGNAL MEANS

BACKGROUND OF THE INVENTION

1. Field of the Invention

The present invention relates to a signal apparatus and more specifically to structure to produce an audible signal at the termination of the cooking cycle of an automatic electric appliance. This signal apparatus of the present invention finds greatest utility when used in conjunction with an automatic coffee maker to indicate the termination of the brew cycle.

2. Description of the Prior Art

The utility of a signal in automatic electric appliances is well recognized in that, as such appliances generally require minimal attention by the user once they have been started, it is an added convenience to be informed when the cooking cycle is complete without the necessity of either having to check the foodstuff in the appliance or in some way determine that the active cooking cycle of the appliance has been automatically terminated.

Signal systems in cooking apparatus therefore, are old in the art with the most familiar probably being the steam whistle of a tea kettle. In automatic appliances, both visual and audible signals are well known with the visual usually including a light bulb situated behind a colored lens and energized at the proper time in the cycle.

Visual signals are quite sufficient if the user is in visual contact with the appliance; however, often as not the user is quite remote from the energized appliance, as in another room, etc., and for this purpose audible signals are also desired.

U.S. Pat. No. 3,226,528 discloses an audible signal for a coffeemaker, and although this signal is in the form of a rather elaborate music box, it is still generally recognized that audible signal means are relatively expensive.

SUMMARY OF THE INVENTION

The present invention provides an audible signal producing means which is relatively inexpensive and employs a snap-acting bimetal disc disposed adjacent to the warming heater of an automatic coffee maker with a movable pin member having one end adjacent one face of the bimetal and the other end a short distance from a bell. Automatic energization of the warmer heater at the termination of the brew cycle, as is presently done in automatic coffee makers, causes the bimetal to snap against the pin and drive it to strike the bell giving a single sharp audible signal. The pin is placed above the bimetal so that gravity restores the pin to the starting position once the bimetal has cooled.

The invention is shown employed in a known automatic coffee maker having a visual signal means so that should the user hear a sound she believes to be the signal, a subsequent look at the coffee maker will confirm whether or not it was the signal of the bell to indicate the brew cycle was completed.

DESCRIPTION OF THE PREFERRED DRAWINGS

DESCRIPTION OF THE PREFERRED EMBODIMENTS

Figure 1:
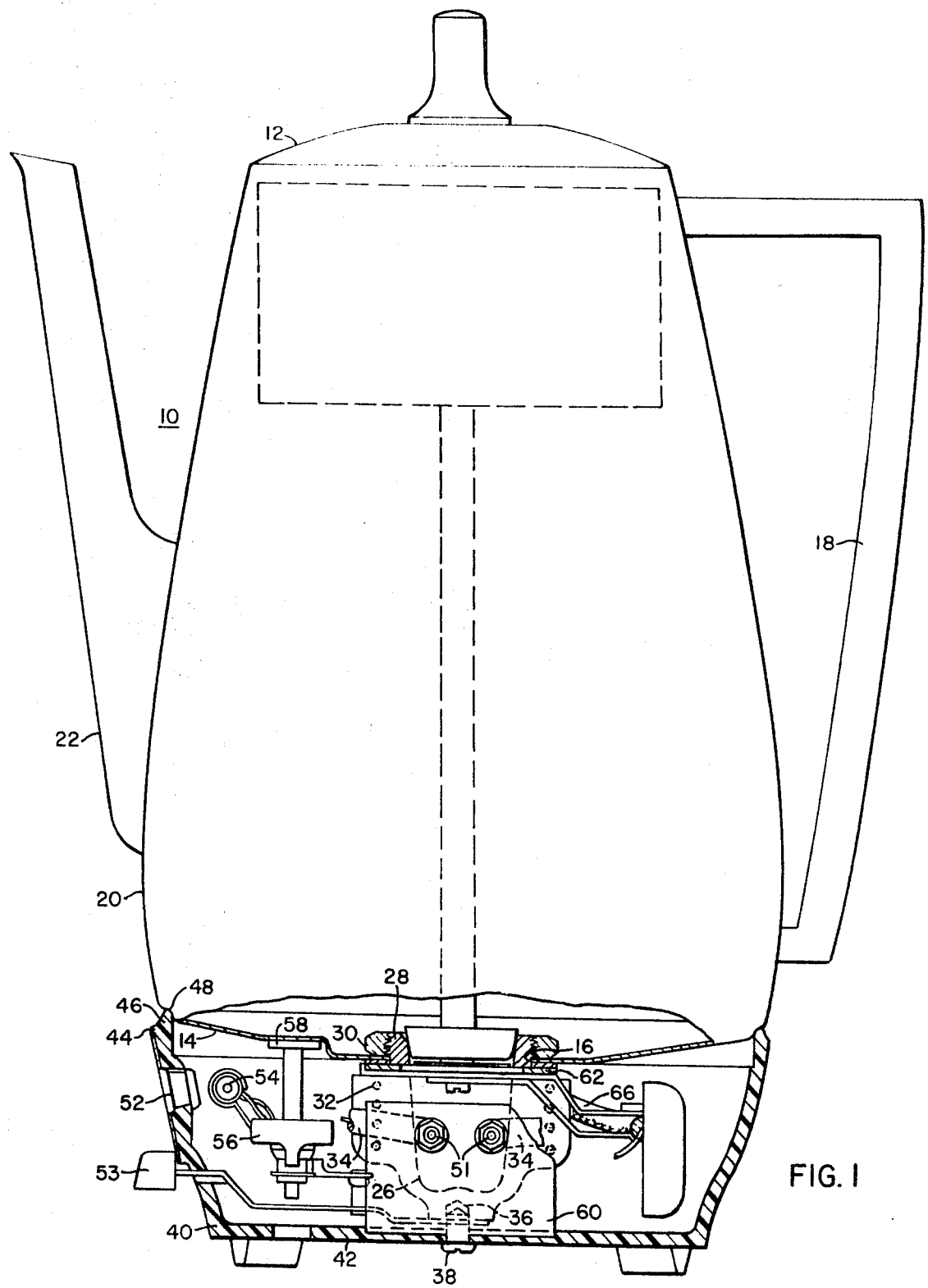
FIG. 1 is an elevational view of an automatic coffee maker having portions in cross section to show the interior.

The signal structure of the present invention is shown in combination with a well known automatic coffee maker which, as shown in FIG. 1, generally comprises a cylindrical container 10 open at the top for receiving a removable cover 12 and having a bottom wall 14 defining a centrally located aperture 16. A handle member 18 is supported on the outside of the side wall 20 of the container by any desirable means, such as screws, and diametrically opposite the handle the side wall supports a spout member 22 about an aperture in the lower portion of the side wall for dispensing the liquid in the container.

A pump well 26 is disposed in sealing engagement in the aperture 16 and generally includes a cup-shaped casting having a threaded lip portion 28 extending upwards through the aperture and receiving a threaded collar 30 for attaching the pump well to the bottom wall 14. The side wall of the pump well includes a sheathed resistance main heater 32 embedded therein having extending connecting leads 34, and the bottom of the well contains a threaded bore 36 for receiving a screw 38 by which a plastic base 40, housing the pump well and controls to be described, is securely mounted to the container portion.

The base 40 itself is essentially bowl shaped having a generally planar bottom wall 42 and a peripheral upstanding side wall 44, the lip 46 of which is nested in a stepped shoulder 48 of the bottom wall 14 of the container for proper seating. Apertures in the side wall of the base provide access to the male connectors 51 and a control lever 53 to adjust the length of the brewing cycle. Another aperture is covered by a translucent colored plastic lens 52 for transmitting light from a bulb 54 within the base generally adjacent the aperture as a means to visually indicate the completion of the brew cycle as is well known in the art.

The leads 34 to the main heater are connected to a stacked bimetal switch 56 which has a probe 58 in intimate conductive heat exchange relationship with the bottom wall 14 of the container and the control lever 53 adjusts the spacing between the contact arms to provide adjustment for the temperature required to be sensed by the probe before the switch is open. The opening temperature can be varied generally between 180° and 210° F with the temperature at which the switch opens determining the relative strength of the finally brewed coffee.

Figure 2:
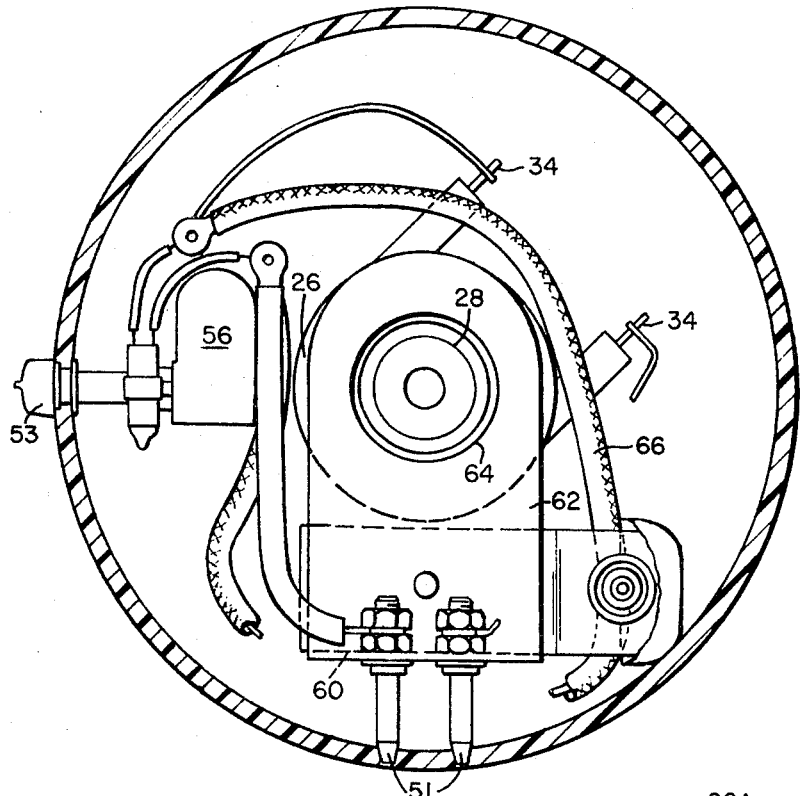
FIG. 2 is a plan view of the base showing the controls of an automatic coffee maker.

The male connectors 51 as seen in FIG. 2 are mounted on an insulator board 60 which in turn is suported by an L-shaped bracket 62, the leg of which contains a aperture 64 through which the lip portion 28 of the pump well extends so that the bracket 62 is secured in position when the pump well is secured to the base of the container.

Figure 4:
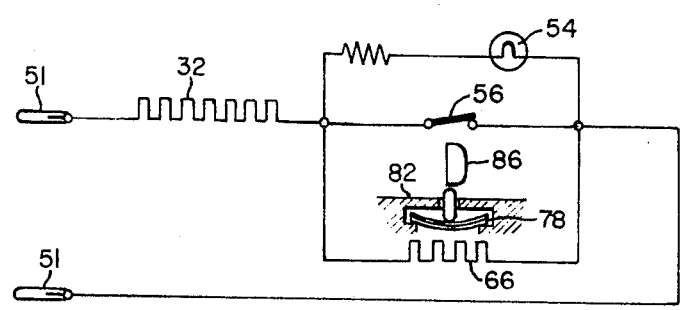
FIG. 4 is a schematic wiring diagram of the present invention.

A warming heater 66 encircles the exterior of the pump well 26 and is disposed generally adjacent the bottom wall 14 of the container, and, as seen in the schematic wiring diagram of FIG. 4, is energized whenever the stacked bimetal switch 56 is open.

Figure 3:
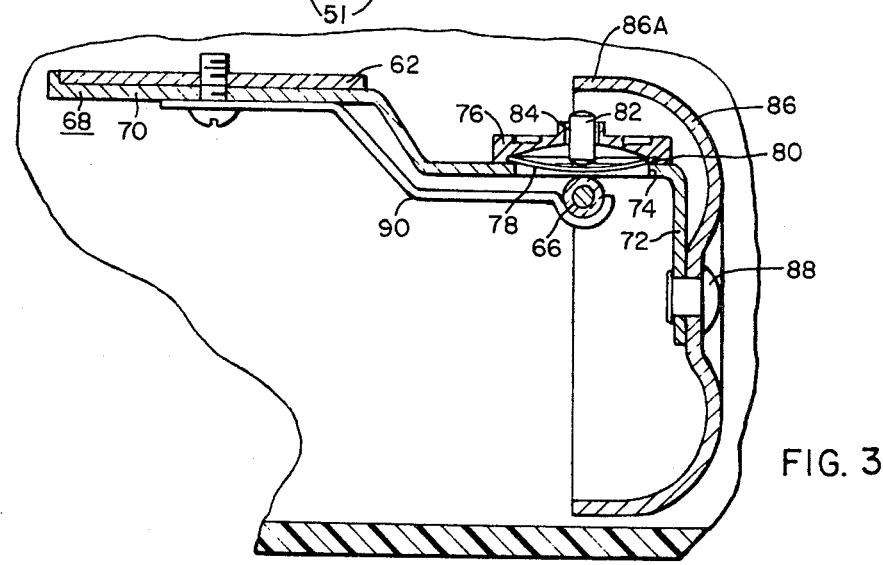
FIG. 3 is a cross-sectional elevational view of the signal means of the present invention.

The signal structure of the present invention is shown attached to the bracket 62 and referring now to FIG. 3, includes a generally L-shaped hanger member 68 attached to the bracket 62 as by a screw and having a generally horizontal leg portion 70 and a vertically depending foot portion 72. The leg portion 70 defines an aperture 74 and supports a collar member 76 overlying the aperture and attached to the leg member as by welding. A snap-acting bimetal disc 78 is confined in the aperture by its periphery being captured within a peripheral shoulder 80 defined between the colar 76 and the periphery of the aperture 74.

The bimetal disc 78 is normally biased to a concave configuration with respect to the collar 76 as is shown, and supports a short metal pin 82 slidably received within a central aperture 84 in the collar 76. The pin 82 is supported for generally vertical movement and is retained in contact with the inner face of the bimetal disc by gravity.

The foot portion 72 of the L-shaped hanger 68 supports a bell 86 as by a rivet 88. The skirt portion 86A of the bell extends to a position which overlies the pin 82 and spaced a short distance thereabove. It is noted that the distance between the pin and the skirt, when the pin is in a retracted position, is such that the pin can contact the skirt when the bimetal snaps to its extreme convex position, and also close enough to retain the pin within the aperture 84 so that the pin cannot be thrown out by the action of the bimetal or drop out by the coffee maker being turned upside down.

The warming heater 66 is supported by a clamping strap 90 so as to have a portion closely adjacent the exterior surface of the bimetal disc 78 as exposed through aperture 74. Thus, in the position the bimetal is responsive to the warmer heater.

From the above description and from the schematic diagram of FIG. 4 it is to be understood that the coffee pot is placed in operative condition, after the desired amount of water and coffee is placed therein, by connecting the male connectors 51 to a common household electrical outlet and setting the lever 53 to the desired brew strength. Once the water in the pot has reached the elevated temperature at which the main thermostat opens the stacked bimetal switch 56, the main heater 32 is connected in series with two parallel branches. One branch includes the indicator bulb 54 and the other branch includes the warming heater 66. Energization through this circuit reduces the wattage in the main heater and the brewing action stops, the bulb 54 is energized and the warming heater is energized to maintain the temperature of the brewed coffee.

The snap-acting bimetal disc 78, being subjected to the heat from the warming heater 66, snaps from its normal at-rest position to a second position, generally convex with respect to the collar 76, throwing the pin 82 against the bell 86 and causing an audible ring of the bell. The bimetal disc 78 is naturally restored to its concave at-rest position upon the heater being cooled when the coffee maker is unplugged and the pin 82 due to gravity, again assumes its at-rest position spaced from the bell and resting against the concave surface of the snap-acting bimetal.

From the above description, it is understood that a relatively inexpensive signal structure generally comprising a support member having a snap-acting bimetal disposed within an aperture defined therein and supporting a movable pin in a manner so as to be responsive to the movement of the bimetal, and further supporting a bell structure generally adjacent the pin so as to be contacted thereby when the pin is moved by the bimetal, is described and can be easily adapted to any automatic electrical appliance which has a melting member that is energized at the termination of the main heating cycle either specifically to actuate the bimetal or as in this case to maintain the appliance in a heated condition until the user has disconnected the appliance.

I claim as my invention:

1. In an automatic coffeemaker having a vessel in which the coffee is brewed and an electric circuit including a heater means attached to said vessel, the heater means including a main electric heater element for heating liquid during the brew cycle and a warmer electric heater element for maintaining the liquid at an elevated temperature at the completion of the brew cycle, and thermostat means in the circuit for selectively controlling the energization of said heater means in response to the temperature of the liquid in the vessel wherein the improvement comprises means for audibly signalling the completion of the brew cycle and mounting means for said signal means, base means mounting the electric circuit, mounting means and signal mans, and supporting the vessel, said signal means comprising:

bell means;
a pin for striking said bell means;
means for movably mounting said pin, and,
means in the base responsive to heat for rapidly forcing said pin from a first position retracted from said bell means to a second position contacting said bell means to cause an audible sound, said heat responsive means mounted adjacent said warmer heater so that said bell is struck when said warmer heater is initially energized at the completion of the brew cycle, said means responsive to heat comprising a snap acting bimetal disc, with said disc having a concave surface facing one end of said pin when said disc is in a relatively unheated condition, and said pin resting against said concave surface when in said first position.

2. Structure according to claim 1 wherein said pin is restored to said first position from said second position by gravity.

3. Structure according to claim 2 wherein said means for mounting said pin comprises a collar permitting longitudinal movement of said pin; and said pin is of a length greater than the distance between said collar and said bell means, whereby said pin contacts said bell and remains contained for longitudinal movement in said collar and is thereby prevented from escaping from said collar.

* * * * *